(12) United States Patent
Hervas

(10) Patent No.: US 7,734,875 B1
(45) Date of Patent: **\*Jun. 8, 2010**

(54) CACHE MANAGEMENT USING HISTORICAL ACCESS INFORMATION

(75) Inventor: Arnaud Hervas, Culver City, CA (US)

(73) Assignee: Apple Inc., Cupertino, CA (US)

( * ) Notice: Subject to any disclaimer, the term of this patent is extended or adjusted under 35 U.S.C. 154(b) by 396 days.

This patent is subject to a terminal disclaimer.

(21) Appl. No.: 11/669,631

(22) Filed: Jan. 31, 2007

Related U.S. Application Data

(63) Continuation of application No. 10/825,815, filed on Apr. 16, 2004, now Pat. No. 7,177,984.

(51) Int. Cl.
 *G06F 12/00* (2006.01)
(52) U.S. Cl. ....................................... 711/133
(58) Field of Classification Search ........................ None
 See application file for complete search history.

(56) References Cited

U.S. PATENT DOCUMENTS

| | | | |
|---|---|---|---|
| 5,787,471 A * | 7/1998 | Inoue et al. ................. | 711/133 |
| 5,906,000 A * | 5/1999 | Abe et al. ................... | 711/151 |
| 5,943,687 A * | 8/1999 | Liedberg .................... | 711/156 |
| 6,269,382 B1 | 7/2001 | Cabrera et al. | |
| 6,490,666 B1 | 12/2002 | Cabrera et al. | |
| 6,546,473 B2 * | 4/2003 | Cherkasova et al. ......... | 711/158 |
| 6,757,794 B2 | 6/2004 | Cabrera et al. | |
| 6,834,329 B2 * | 12/2004 | Sasaki et al. ................ | 711/134 |
| 7,177,984 B1 * | 2/2007 | Hervas ....................... | 711/133 |

\* cited by examiner

*Primary Examiner*—Hiep T Nguyen
(74) *Attorney, Agent, or Firm*—Fenwick & West LLP

(57) ABSTRACT

A caching manager calculates cache priorities for accessed items, including items not currently stored in the cache. The cache manager determines an item's cache priority as a function of the item's access frequency, retrieval cost and size. The cache manager dynamically updates cache priorities as items are accessed. When the cache is full and a non-cached item is accessed, the cache manager uses cache priorities to determine whether to overwrite a cached item with the non-cached accessed item. If the accessed item has a lower cache priority than all of the items in the cache, then the non-cached item is not stored in the cache. If any item in the cache has a lower cache priority than the accessed item, then the cache manager stores the accessed item in the cache, overwriting the cached item with the lowest cache priority.

35 Claims, 3 Drawing Sheets

CACHE MANAGEMENT USING HISTORICAL ACCESS INFORMATION

CROSS-REFERENCE TO RELATED APPLICATION

This application claims the benefit under 35 U.S.C. §120 as a continuation of patent application Ser. No. 10/825,815, filed on Apr. 16, 2004, entitled "Cache Management Using Historical Access Information," by Arnaud Hervas.

BACKGROUND

1. Field of Invention

The present invention relates generally to cache management, and more specifically to cache management using historical access information to determine which items to store in the cache.

2. Background of Invention

Many systems repeatedly access items from a set of stored data. The set of data items is commonly stored in persistent memory, such as on a magnetic drive. To speed up the access process, the accessing system often stores a subset of the data items in a cache in faster memory, such as random access memory, based upon the amount of space available therein.

Determining which items from the data set to store in the cache is a complicated problem. In the prior art, where the cache is full and the system accesses an uncached item, the system typically determines an existing item in the cache to overwrite with the accessed item. One prior art technique is to overwrite the least recently accessed cached item (this technique is known as LRU).

LRU appears to make sense on its face, but does not produce desirable results under all circumstances. Imagine a scenario in which a cache holds n items, and a system is repeatedly accessing a series of n+1 items in the order 1, 2 . . . n. This scenario could be, for example, a video player repeating a loop of n+1 frames. The player would access and cache items 1 through n, thereby filling the cache. The next item accessed would be n+1, which would be stored in the cache by overwriting item 1, the least recently accessed item in the cache. However, the next item the system would access after n+1 would be item 1, which would no longer be in the cache, and thus would have to be accessed from slow memory, and added to the cache by overwriting item 2. Because item 2 would then be needed, the system would have to retrieve it from slow memory, and so on ad infinitum, with the system never actually accessing an item from the cache. Of course this is the worst case scenario, but other less bad scenarios exist in which LRU still results in inefficient cache utilization.

In another prior art technique, the system overwrites the most recently utilized item in the cache (this is known as MRU). As one can see, this would avoid the worst case scenario for LRU described above, but can produce inefficient cache utilization under other circumstances. For example, suppose that the video player described above is replaying a frame x and its previous frame x−1 multiple times (e.g., during an editing session). By repeatedly, cyclically overwriting the most recently accessed frame x−1 with the currently accessed frame x and then overwriting most recently accessed frame x with currently accessed frame x−1, the system would never utilize the benefit of cache access, but instead always access x and x−1 from slow memory.

A more advanced prior art method determines whether all of the working data will fit in the cache, and utilizes LRU if so and MRU if not. This method, while better than either LRU or MRU on their own, still results in some inefficiencies and shortcomings of both methods under certain circumstances. Furthermore, the prior art techniques such as MRU and LRU, whether alone or in combination, do not take into account historical patterns of access requests over time when deciding which cache item to overwrite. Additionally, these methods only consider data in the cache, as opposed to all accessed data whether currently residing in the cache or not. As a result, the methods necessarily omit relevant information when managing a cache, and typically suffer in efficiency as a result.

What is needed are methods, systems and computer program products that utilize historical access information concerning historically accessed data items in order to robustly manage a cache.

SUMMARY OF INVENTION

A caching manager calculates cache priorities for accessed items, including those not currently stored in the cache. An item's cache priority is determined as a function of the item's access frequency, retrieval cost and size, and is updated dynamically as the item is accessed. When the cache is full and a non-cached item is accessed, the cache manager uses cache priorities to determine whether to overwrite a cached item with the non-cached accessed item. If the accessed item has a lower cache priority than all of the items in the cache, then the non-cached item is not stored in the cache. However, if any item in the cache has a lower cache priority than the accessed item, then the cache manager stores the accessed item in the cache, overwriting the cached item with the lowest cache priority.

Thus, the cache manager stores items in the cache based on their cache priority. Because the cache manager dynamically updates cache priorities responsive to requests for items, the cache priorities, and hence which items are stored in the cache, are a function of item access history.

The features and advantages described in this summary and the following detailed description are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
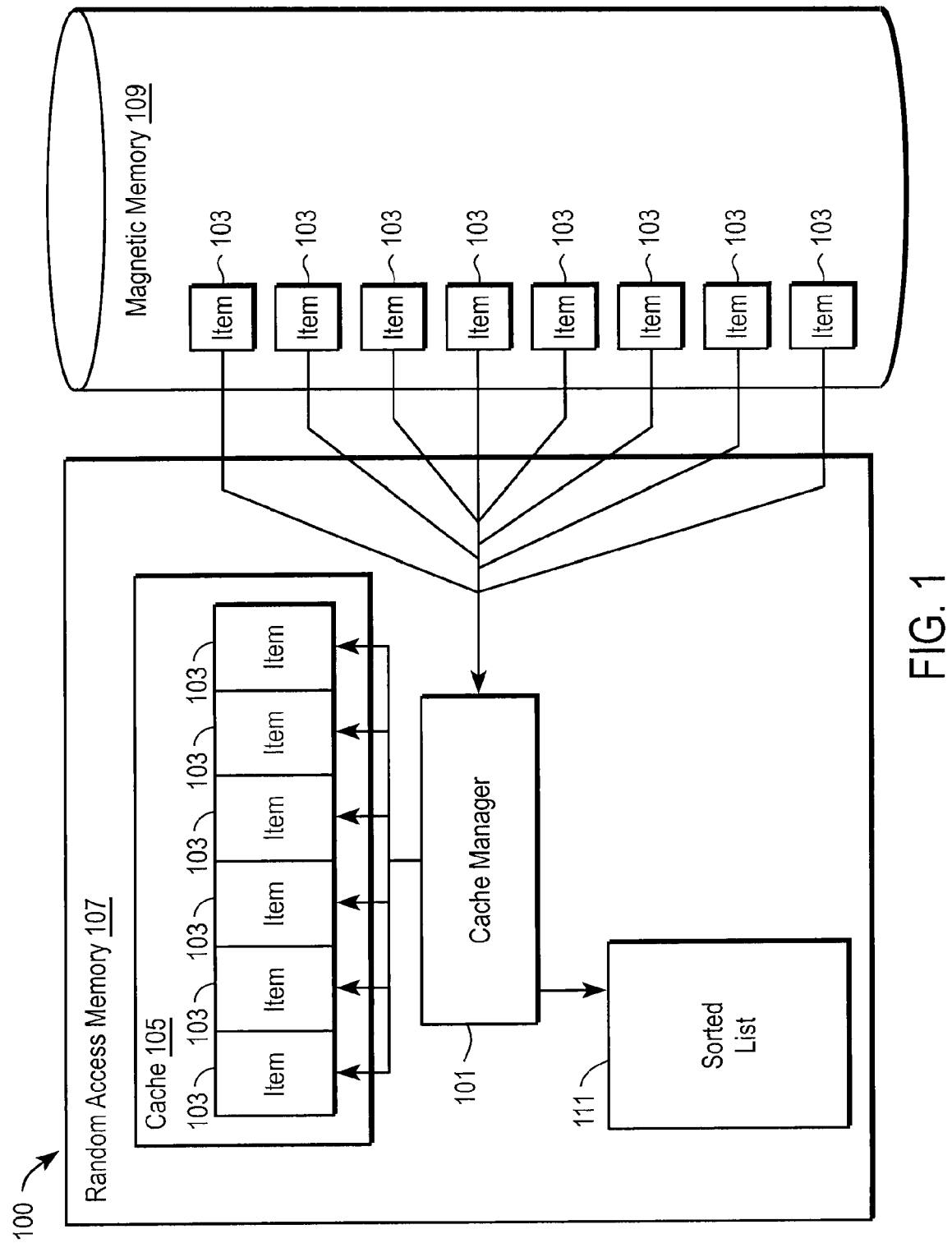
FIG. 1 is a block diagram, illustrating a high level overview of a system for using historical access information to manage a cache, according to some embodiments of the present invention.

FIG. 1 illustrates a high level overview of a system 100 for performing some embodiments of the present invention. As illustrated in FIG. 1, a cache manager 101 accesses stored data items 103, and uses information concerning the access of these data items 103 over time to manage a cache 105. It is to be understood that although the cache manager 101 is illustrated as a single entity, as the term is used herein a cache manager 101 refers to a collection of functionalities which can be implemented as software, hardware, firmware or any combination of the three. Where a cache manager 101 is implemented as software, it can be implemented as a standalone program, but can also be implemented in other ways, for example as part of a larger program, as a plurality of separate programs, or as one or more statically or dynamically linked libraries.

As illustrated in FIG. 1, the cache manager 101 retrieves stored items 103, and stores a subset of those items 103 in a cache 105. Typically, items will be accessed when requested by another process, for example an application program (not shown). Note that although in FIG. 1 the cache 105 is illustrated as being in random access memory 107 and the non-cached stored data items 103 are illustrated as being in magnetic memory 109, other storage scenarios are possible in other environments, and are within the scope of the present invention. For example, a cache 105 can be located on a microprocessor, and non-cached items 103 can be stored on optical media.

In order to determine which items 103 to store in the cache 105, the cache manager 101 assigns a cache priority to each accessed item 103, as a function of the item's 103 size, retrieval cost and access frequency. As explained in greater detail below, the cache manager 101 uses cache priorities to determine which items 103 to store in the cache 105.

In some embodiments, the cache manager 101 calculates an item's 103 size relative to the size of the cache 105, for example by dividing the size of the item 103 by the size of the cache 105. This normalizes an item's 103 absolute size to account for the size of the actual cache 105 in use. In some embodiments, the cache manager 101 calculates an item's 103 retrieval cost as a function of the amount of time it takes to retrieve the item 103 when it is not cached, and the item's 103 size. For example, the cache manager 101 can divide the retrieval time for the item 103 by the size of the item 103, to get a normalized value of retrieval cost per unit (e.g., byte, pixel, etc) of the item 103. In some embodiments, the cache manager 101 calculates an item's 103 access frequency relative to the access frequency for other items 103, for example by dividing the number of requests for the item 103 during a period of time by the total number of requests for any item 103 during the same time period. It is to be understood that variations on these methodologies of calculating size, retrieval cost and access frequency are possible, and will be apparent to those of ordinary skill in the relevant art in light of this specification. Such alternatives are within the scope of the present invention.

In some embodiments, in order to calculate the actual cache priority for an item 103, the cache manager 101 multiplies the item's 103 size, retrieval cost and access frequency. In other embodiments, normalization factors (such as adjusting one or more operands up or down, for example by multiplying by a constant) are employed.

Each time access to an item 103 is requested, the cache manager 101 determines whether the requested item 103 has an assigned cache priority. If it does not, the cache manager 101 calculates a cache priority and assigns it to the item 103. If the item 103 already has an associated cache priority, the cache manager 101 updates that cache priority to reflect the request for the item 103 (the fact that the request has occurred affects the access frequency), thereby dynamically updating cache priorities as items 103 are accessed. Various implementation mechanics are possible for updating cache priorities accordingly, and will be apparent to those of ordinary skill in the relevant art in light of this specification. All such variations are within the scope of the present invention.

The cache manager 101 keeps track of cache priorities not only for items currently in the cache 105 but for other requested items 103 as well, including those that are not currently in the cache 105. To facilitate keeping track of the cache priorities, as illustrated in FIG. 1, in some embodiments the cache manager 101 maintains a sorted list 111 of associations between each accessed item 103 and its cache priority. The associations in the sorted list 111 can be in any format, for example a data structure containing the name or another identifier of the item 103, and its associated cache priority. Various association formats will be apparent to those of ordinary skill in the art in light of this specification, all of which are within the scope of the present invention. Of course, various specific ordered data structures can be used as (or in place of) a sorted list 111, for example a doubly or singly linked list, a b-tree, etc. The implementation mechanics of efficiently ordering and storing data are known in the art.

Figure 2:
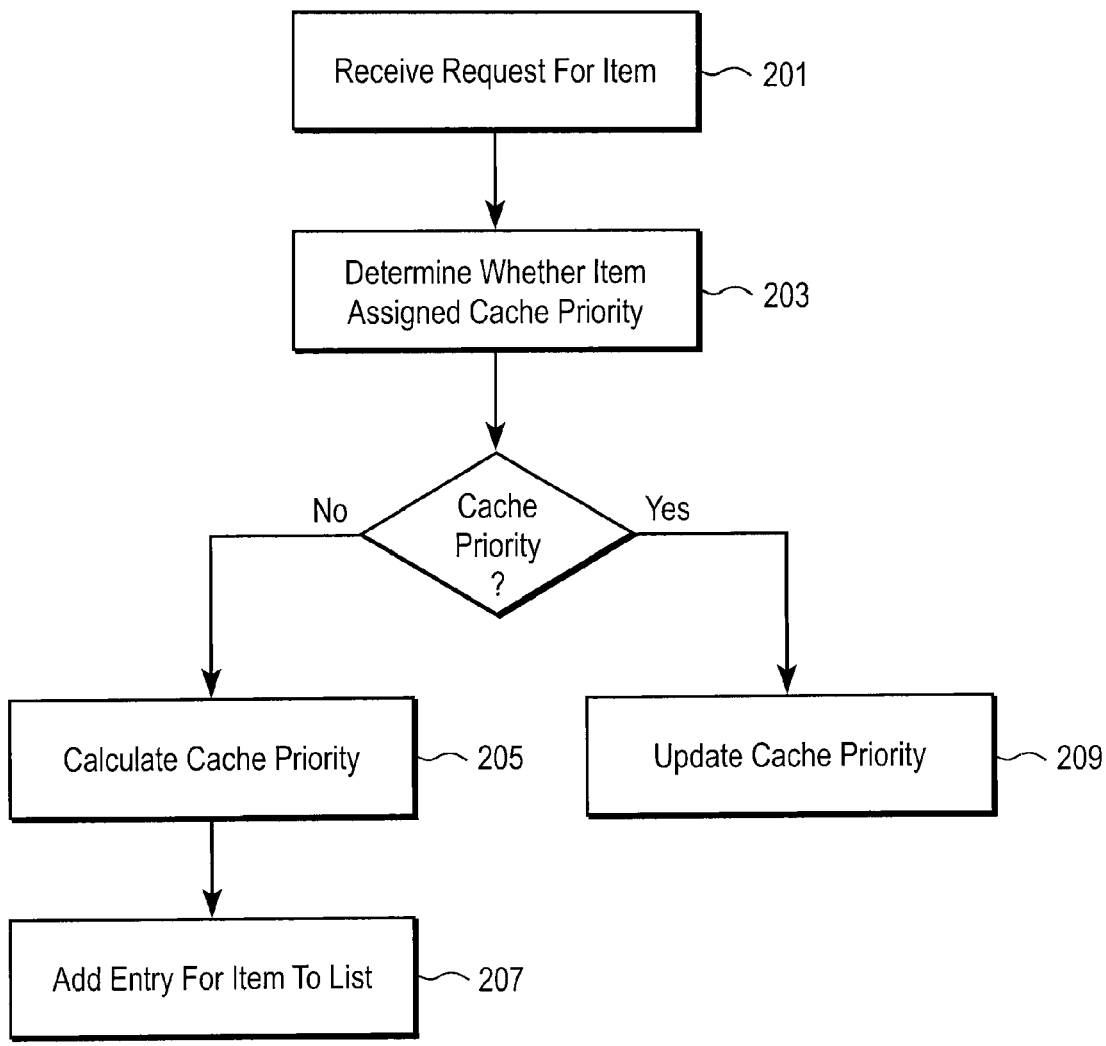
FIG. 2 is a flowchart, illustrating steps for the cache manager processing requests for items, according to some embodiments in which the cache manager maintains a sorted list.

Steps for the cache manager 101 processing requests for items 103 in some embodiments in which the cache manager 101 maintains a sorted list 111 are illustrated in FIG. 2. The cache manager 101 receives 201 a request for an item 103, and determines 203 whether the requested item 103 has been assigned a cache priority by reading the sorted list 111. The implementation mechanics of efficiently searching for specific data within an ordered data structure is known in the art. If the requested item 103 has not been assigned a cache priority, the cache manager 101 calculates 205 a cache priority for the item 103, and adds 207 an entry associating the requested item 103 with the cache priority to the sorted list 111. On the other hand, if the item 103 has already been assigned a cache priority, the cache manager 101 updates 209 the requested item's 103 entry in the sorted list 111 to reflect the occurrence of the request for the item 103.

Figure 3:
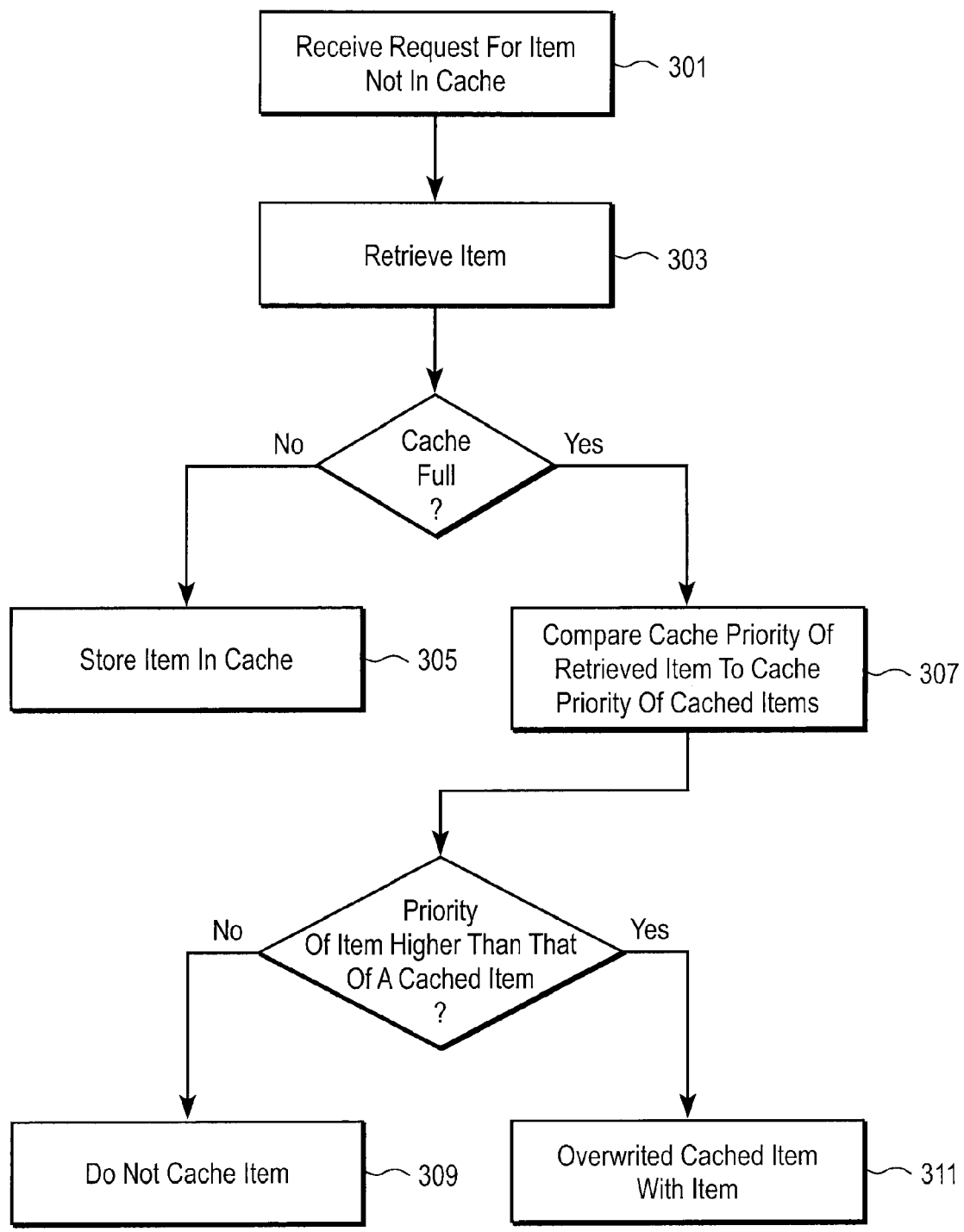
FIG. 3 is a flowchart, illustrating steps for the cache manager using cache priorities to determine which items to store in the cache, according to some embodiments of the present invention.

As indicated above, the cache manager 101 uses the cache priorities to determine which items 103 to store in the cache 105. This process is illustrated in FIG. 3, according to some embodiments of the present invention. The cache manager 101 receives 301 a request for an item 103 which is not in the cache 105. The cache manager 101 retrieves 303 the item 103 from storage, and determines whether the cache is full. If the cache 105 is not full, the cache manager 101 can simply store 305 the item 103 in the cache 105 for future access. However, if the cache manager 101 determines that the cache 105 is full, the cache manager 101 compares 307 the cache priority of the retrieved item 103 to the cache priority of each item 103 in the cache 105, to determine whether or not to overwrite a cached item 103 with the retrieved item 103. If the cache manager 101 determines that no item 103 in the cache 105 has a cache priority lower than the retrieved item 103, the cache manager 101 does not store 309 the retrieved item 103 in the cache 105. However, if the cache priority of at least one item 103 in the cache 105 is lower than the cache priority of the retrieved item 103, the cache manager 101 overwrites 311 the cached item 103 with the lowest cache priority with the retrieved item 103.

Thus, the cache manager 101 stores items 103 in the cache 105 based on their cache priority. Because the cache manager 101 dynamically updates cache priorities responsive to requests for items 103, the cache priorities, and hence which items 103 are stored in the cache 105, are a function of item 103 access history. Since historically accessed items 103 have cache priorities and not just those in the cache 105 at any one time, the access history is complete. Finally, by including item 103 size and retrieval cost in the cache priority as well as access frequency, the cache manager 101 is able to determine which items 103 to store in the cache 105 as a function of how likely the items 103 are to be accessed, as well as the cost of retrieving the items 103 if they are not cached, and the percentage of the cache 105 that the items 103 would require.

As will be understood by those familiar with the art, the invention may be embodied in other specific forms without departing from the spirit or essential characteristics thereof. Likewise, the particular naming and division of the modules, features, attributes, methodologies, managers and other aspects are not mandatory or significant, and the mechanisms that implement the invention or its features may have different names, divisions and/or formats. Furthermore, as will be apparent to one of ordinary skill in the relevant art, the modules, features, attributes, methodologies, managers and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

What is claimed is:

1. A method for managing a cache, wherein an accessed item has been assigned a cache priority, and wherein the accessed item is not in the cache, and wherein the cache is full, comprising:
   determining which item in the cache has been assigned the lowest cache priority of the items in the cache;
   determining whether the cache priority of the accessed item is higher than the cache priority of the lowest-cache-priority item; and
   responsive to determining that the cache priority of the accessed item is not higher than the cache priority of the lowest-cache-priority item, not storing the accessed item in the cache.

2. A method for managing a cache, comprising:
   assigning a first cache priority to a first item;
   responsive to the first item being accessed, updating the first cache priority;
   assigning a second cache priority to a second item; and
   determining, based on the first cache priority and the second cache priority, whether to store the second item in the cache.

3. The method of claim 2, wherein assigning the first cache priority to the first item comprises assigning the first cache priority to the first item based on a size of the first item.

4. The method of claim 3, wherein the size of the first item is relative to a size of the cache.

5. The method of claim 2, wherein assigning the first cache priority to the first item comprises assigning the first cache priority to the first item based on a retrieval cost of the first item.

6. The method of claim 5, wherein the retrieval cost of the first item is based on a retrieval time of the first item.

7. The method of claim 2, wherein assigning the first cache priority to the first item comprises assigning the first cache priority to the first item based on an access frequency of the first item.

8. The method of claim 7, wherein the access frequency of the first item is relative to an access frequency of the second item.

9. The method of claim 7, wherein the access frequency of the first item is equal to a number of requests for the first item during a period of time divided by a total number of requests for items during the period of time.

10. The method of claim 2, wherein the first cache priority is equal to a product of a size of the first item, a retrieval cost of the first item, and an access frequency of the first item.

11. A system for managing a cache, comprising:
    a first assigner configured to assign a first cache priority to a first item;
    an updater configured to update, responsive to the first item being accessed, the first cache priority;
    a second assigner configured to assign a second cache priority to a second item; and
    a determiner configured to determine, based on the first cache priority and the second cache priority, whether to store the second item in the cache.

12. A computer program product for managing a cache, wherein an accessed item has been assigned a cache priority, and wherein the accessed item is not in the cache, and wherein the cache is full, comprising:
    a computer-readable medium; and
    computer program code, encoded on the medium, for:
        determining which item in the cache has been assigned the lowest cache priority of the items in the cache;
        determining whether the cache priority of the accessed item is higher than the cache priority of the lowest-cache-priority item; and
        responsive to determining that the cache priority of the accessed item is not higher than the cache priority of the lowest-cache-priority item, not storing the accessed item in the cache.

13. A method for managing a cache, comprising:
    assigning a cache priority to each of a plurality of accessed items, wherein the cache priority assigned to an accessed item is based on a size of the accessed item relative to a size of the cache;
    as each item is accessed, updating the cache priority assigned to the item; and
    determining which items to store in the cache as a function of cache priority.

14. The method of claim 13, wherein the cache priority assigned to the accessed item is further based on a retrieval cost of the accessed item.

15. The method of claim 14, wherein the retrieval cost of the accessed item is based on a retrieval time of the accessed item.

16. The method of claim 13, wherein the cache priority assigned to the accessed item is further based on an access frequency of the accessed item.

17. The method of claim 16, wherein the access frequency of the accessed item is equal to a number of requests for the accessed item during a period of time divided by a total number of requests for items during the period of time.

18. The method of claim 13, wherein the cache priority assigned to the accessed item is equal to a product of a size of the accessed item, a retrieval cost of the accessed item, and an access frequency of the accessed item.

19. A computer program product for managing a cache, comprising:
a computer-readable medium; and
computer program code, encoded on the medium, for:
assigning a first cache priority to a first item;
responsive to the first item being accessed, updating the first cache priority;
assigning a second cache priority to a second item; and
determining, based on the first cache priority and the second cache priority, whether to store the second item in the cache.

20. The computer program product of claim 19, wherein assigning the first cache priority to the first item comprises assigning the first cache priority to the first item based on a size of the first item.

21. The computer program product of claim 20, wherein the size of the first item is relative to a size of the cache.

22. The computer program product of claim 19, wherein assigning the first cache priority to the first item comprises assigning the first cache priority to the first item based on a retrieval cost of the first item.

23. The computer program product of claim 22, wherein the retrieval cost of the first item is based on a retrieval time of the first item.

24. The computer program product of claim 19, wherein assigning the first cache priority to the first item comprises assigning the first cache priority to the first item based on an access frequency of the first item.

25. The computer program product of claim 24, wherein the access frequency of the first item is relative to an access frequency of the second item.

26. The computer program product of claim 24, wherein the access frequency of the first item is equal to a number of requests for the first item during a period of time divided by a total number of requests for items during the period of time.

27. The computer program product of claim 19, wherein the first cache priority is equal to a product of a size of the first item, a retrieval cost of the first item, and an access frequency of the first item.

28. A computer program product for managing a cache, comprising:
a computer-readable medium; and
computer program code, encoded on the medium, for:
assigning a cache priority to each of a plurality of accessed items, wherein the cache priority assigned to an accessed item is based on a size of the accessed item relative to a size of the cache;
as each item is accessed, updating the cache priority assigned to the item; and
determining which items to store in the cache as a function of cache priority.

29. The computer program product of claim 28, wherein the cache priority assigned to the accessed item is further based on a retrieval cost of the accessed item.

30. The computer program product of claim 29, wherein the retrieval cost of the accessed item is based on a retrieval time of the accessed item.

31. The computer program product of claim 28, wherein the cache priority assigned to the accessed item is further based on an access frequency of the accessed item.

32. The computer program product of claim 31, wherein the access frequency of the accessed item is equal to a number of requests for the accessed item during a period of time divided by a total number of requests for items during the period of time.

33. The computer program product of claim 28, wherein the cache priority assigned to the accessed item is equal to a product of a size of the accessed item, a retrieval cost of the accessed item, and an access frequency of the accessed item.

34. A system for managing a cache, comprising:
an assigner configured to assign a cache priority to each of a plurality of accessed items, wherein the cache priority assigned to an accessed item is based on a size of the accessed item relative to a size of the cache;
an updater configured to update, as each item is accessed, the cache priority assigned to the item; and
a determiner configured to determine which items to store in the cache as a function of cache priority.

35. A system for managing a cache, wherein an accessed item has been assigned a cache priority, and wherein the accessed item is not in the cache, and wherein the cache is full, comprising:
a first determiner configured to determine which item in the cache has been assigned the lowest cache priority of the items in the cache;
a second determiner configured to determine whether the cache priority of the accessed item is higher than the cache priority of the lowest-cache-priority item; and
a storer configured to not store the accessed item in the cache responsive to determining that the cache priority of the accessed item is not higher than the cache priority of the lowest-cache-priority item.

* * * * *